(12) United States Patent
Pritchard

(10) Patent No.: US 7,355,747 B2
(45) Date of Patent: Apr. 8, 2008

(54) SYSTEM FOR IMPROVING THE SPEED OF DATA PROCESSING

(75) Inventor: Thomas B Pritchard, Brush Prairie, WA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 995 days.

(21) Appl. No.: 10/054,652

(22) Filed: Jan. 18, 2002

(65) Prior Publication Data

US 2003/0137698 A1 Jul. 24, 2003

(51) Int. Cl.
*G06F 15/00* (2006.01)

(52) U.S. Cl. .................. 358/1.9; 358/3.03; 358/3.05; 358/3.06; 382/252; 345/616

(58) Field of Classification Search ............... 358/1.9, 358/3.03–3.06; 382/252; 345/616
See application file for complete search history.

(56) References Cited

U.S. PATENT DOCUMENTS

| | | | |
|---|---|---|---|
| 5,012,257 A | 4/1991 | Lowe et al. | |
| 5,111,302 A | 5/1992 | Chan et al. | |
| 5,377,024 A | 12/1994 | Dillinger | |
| 5,402,245 A | 3/1995 | Motta et al. | |
| 5,473,446 A | 12/1995 | Perumal, Jr. et al. | |
| 5,537,228 A | 7/1996 | Dillinger | |
| 5,657,137 A | 8/1997 | Perumal, Jr. et al. | |
| 5,710,827 A | 1/1998 | Perumal, Jr. et al. | |
| 5,809,217 A | 9/1998 | Bunce | |
| 5,812,744 A | 9/1998 | Allebach et al. | |
| 5,892,851 A | 4/1999 | Nguyen | |
| 5,898,505 A | 4/1999 | Lin et al. | |
| 5,930,010 A | 7/1999 | Cheung et al. | |
| 5,949,964 A | 9/1999 | Clouthier et al. | |
| 5,949,965 A | 9/1999 | Gondek | |
| 5,973,803 A | 10/1999 | Cheung et al. | |
| 5,974,228 A | 10/1999 | Heitsch | |
| 5,982,990 A | 11/1999 | Gondek | |
| 5,991,512 A | 11/1999 | Shaked et al. | |
| 6,057,933 A | 5/2000 | Hudson et al. | |
| 6,081,344 A | 6/2000 | Bockman et al. | |

(Continued)

OTHER PUBLICATIONS

Hewlett-Packard Company patent application, U.S. Appl. No. 08/812,777; filed on Mar. 6, 1997; "Fast Error Diffusion Algorithm."

(Continued)

*Primary Examiner*—Twyler L Haskins
*Assistant Examiner*—Mark R. Milia

(57) ABSTRACT

An apparatus includes a first processing device to perform halftoning on a first set of values corresponding to a first set of pixels and a second processing device to perform halftoning on a second set of values corresponding to a second set of pixels, with ones of the first set of pixels located adjacent to the second set of pixels and with ones of the second set of pixels located adjacent to the first set of pixels. The apparatus further includes a bus arranged for transferring a third set of values, from the halftoning of ones of the first set of values corresponding to the ones of the first set of pixels, to the second processing device and for transferring a fourth set of values, from the halftoning of ones of second set of values corresponding to the ones of the second set of pixels, to the first processing device.

31 Claims, 8 Drawing Sheets

U.S. PATENT DOCUMENTS

| | | | |
|---|---|---|---|
| 6,108,452 A * | 8/2000 | Ilbery | 382/252 |
| 6,307,978 B1 * | 10/2001 | Metaxas | 382/252 |
| 6,476,934 B1 * | 11/2002 | Ilbery et al. | 382/252 |
| 6,775,027 B1 * | 8/2004 | Yamamura | 358/1.9 |
| 6,870,642 B2 * | 3/2005 | Ostromoukhov | 358/3.03 |
| 2002/0122210 A1 * | 9/2002 | Ilbery | 358/3.04 |

OTHER PUBLICATIONS

English translation of Japanese Examiner's comments.

* cited by examiner

SYSTEM FOR IMPROVING THE SPEED OF DATA PROCESSING

Imaging systems, such as those that include imaging devices like electrophotographic imaging devices or inkjet imaging devices, include the capability to form images on media corresponding to image data. Typically, the image data specifies colors in the image in the RGB color space. Rendering of the image data, which may be performed in the imaging device or external to the imaging device, generates 24 bit RGB values corresponding to each pixel forming the image. Typically, at some stage in the processing of the image data, the 24 bit per pixel RGB values undergo a color space conversion to 32 bit per pixel CMYK values. A 32 bit CMYK value includes 8 bits to define color values for each of the C, M, Y, and K colors for the corresponding pixel. Generally, imaging devices do not have the capability to reproduce a number of tones corresponding to the number of levels of color that could be specified for the pixel. For example, with a 32 bit per pixel CMYK value, 256 tone levels can be specified for each of the colors for each pixel. However, imaging devices such as an inkjet printers or electrophotographic printers typically do not include the capability to form 256 tone levels of colorant onto a pixel.

It is desired that an imaging device have the capability to produce an image that closely corresponds to the image data provided to it. Because of the limited ability to reproduce the range of tone levels specified by the color values, to reproduce an image corresponding to the image data, some transformation is generally applied to the CMYK values. One type of transformation that may be used includes a halftoning operation. In a halftoning operation the color values for the pixels are converted from a relatively large number of possible tone levels to a relatively small number of tone levels. One class of halftoning process that has been developed is known as error diffusion halftoning. In an error diffusion halftoning operation, error terms are generated from comparing the color values of a pixel for the various colors to predetermined values. The error terms are distributed to the surrounding pixels to improve quality of the resulting image formed on media. Performing error diffusion halftoning is computationally intensive. Improving the efficiency with which error diffusion halftoning is performed can provide improved performance in imaging systems.

SUMMARY OF THE INVENTION

A method includes partitioning a group of pixels, corresponding to a group of values, into a plurality of segments, with each of the segments including a plurality of rows of the pixels. The method further includes halftoning a first plurality of values, corresponding to a first one of the plurality of rows in a first one of the plurality of segments, to form a first plurality of error terms. In addition, the method includes halftoning, using at least one of the first plurality of error terms, on a second plurality of values corresponding to a second one of the plurality of rows in a second one of the plurality of segments, after completion of the halftoning on the first plurality of values, to form a second plurality of error terms.

An apparatus includes a first processing device to perform halftoning on a first set of values corresponding to a first set of pixels and a second processing device to perform halftoning on a second set of values corresponding to a second set of pixels, with ones of the first set of pixels located adjacent to the second set of pixels and with ones of the second set of pixels located adjacent to the first set of pixels. The apparatus further includes a bus arranged for transferring a third set of values, from the halftoning of ones of the first set of values corresponding to the ones of the first set of pixels, to the second processing device and for transferring a fourth set of values, from the halftoning of ones of second set of values corresponding to the ones of the second set of pixels, to the first processing device.

DESCRIPTION OF THE DRAWINGS

A more thorough understanding of embodiments of the processing system may be had from the consideration of the following detailed description taken in conjunction with the accompanying drawings in which:

Shown in FIG. 1 is an embodiment of an inkjet printer.

Figure 2:
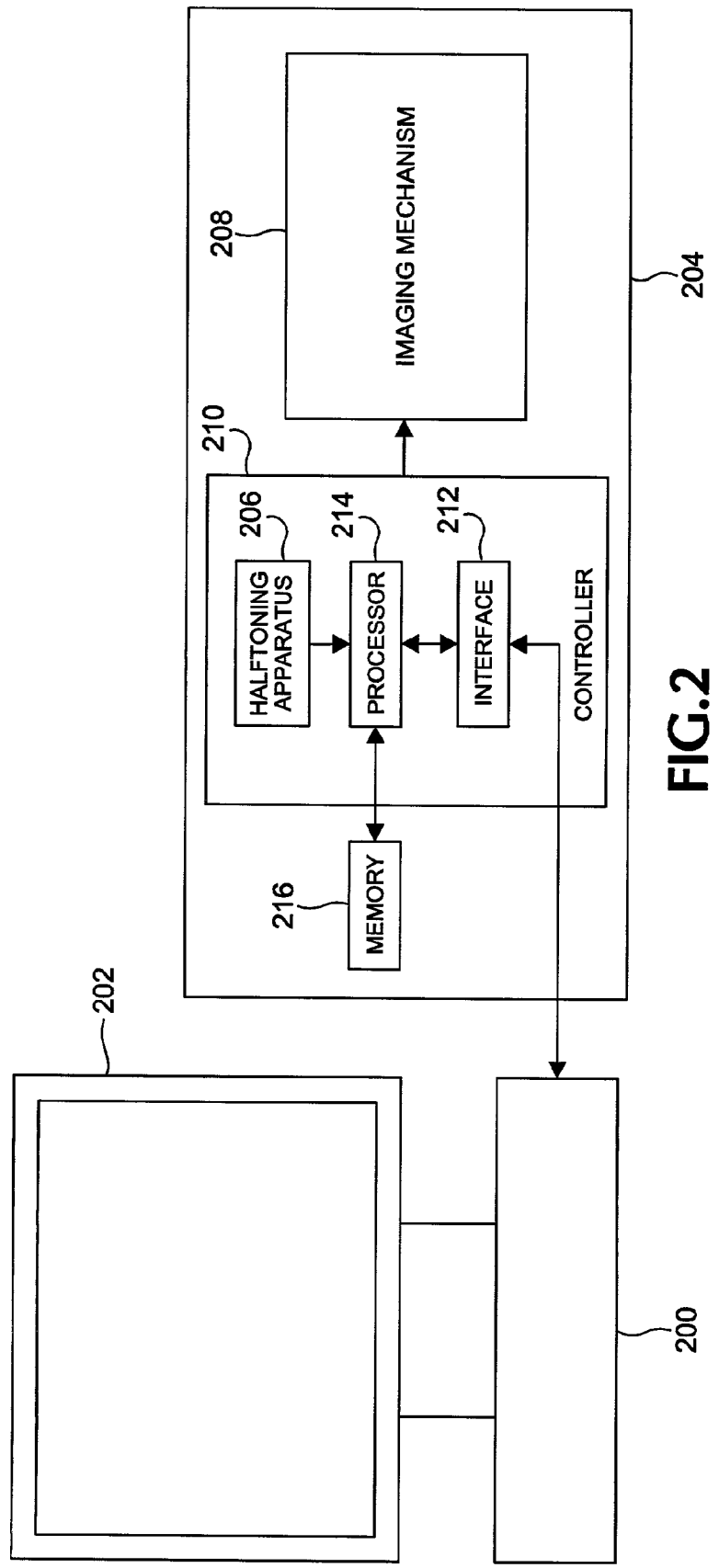

Shown in FIG. 2 is a high level block diagram of an embodiment of an imaging device.

Figure 3:
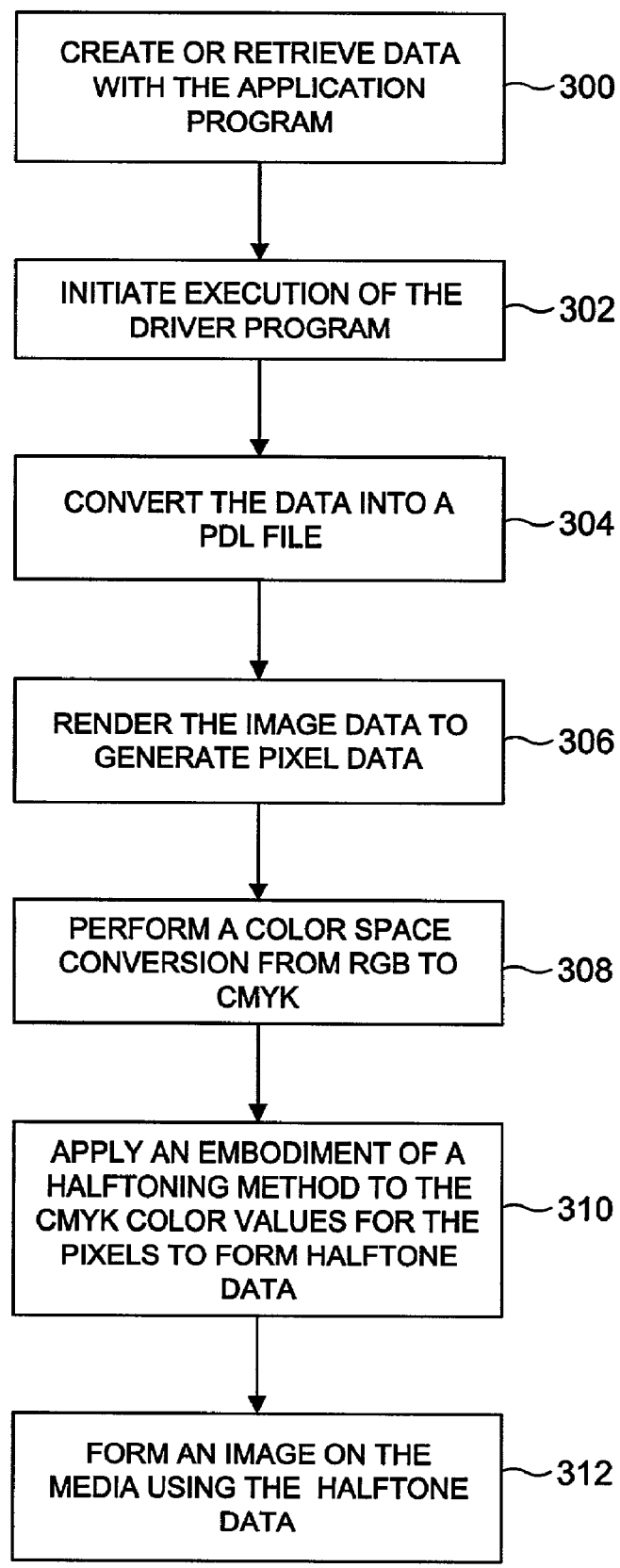

Shown in FIG. 3 is a high level flow chart of a method for forming images on media.

Figure 4:
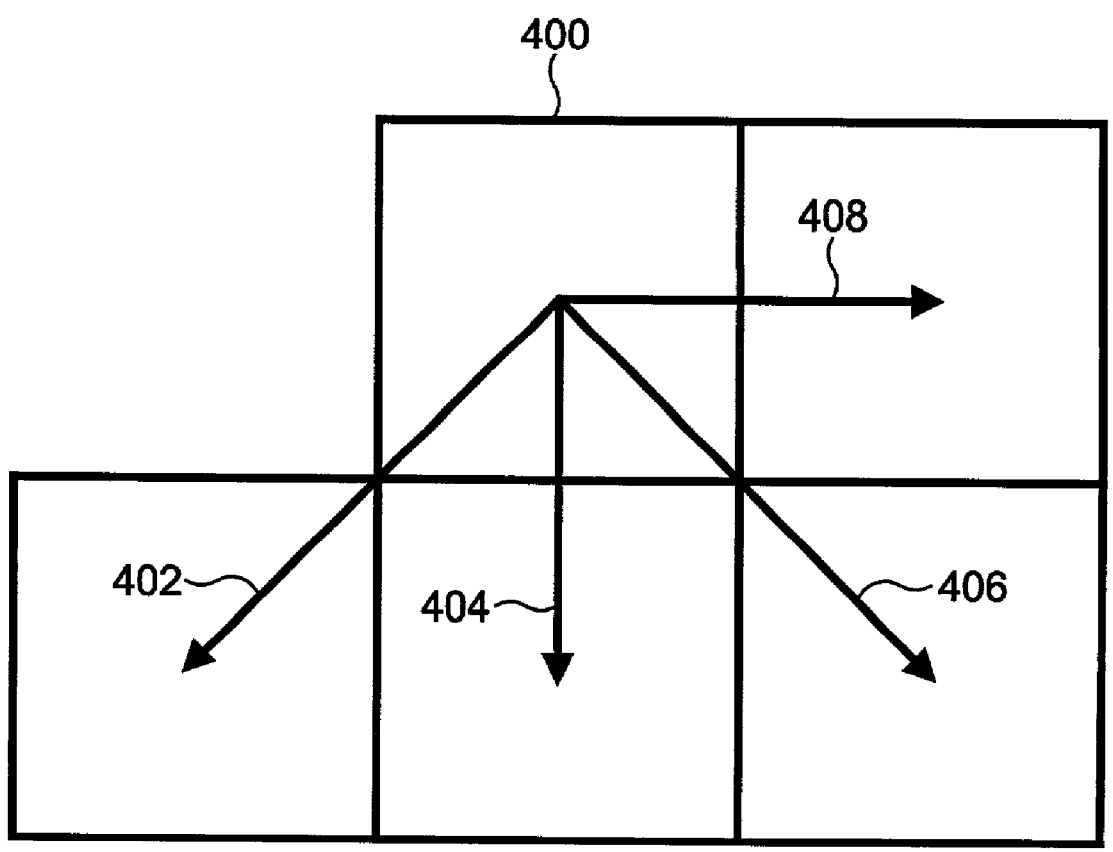

Shown in FIG. 4 is a representation of the way in which an error value can be distributed to nearby pixels in performing an embodiment of an error diffusion halftoning process.

Figure 5:
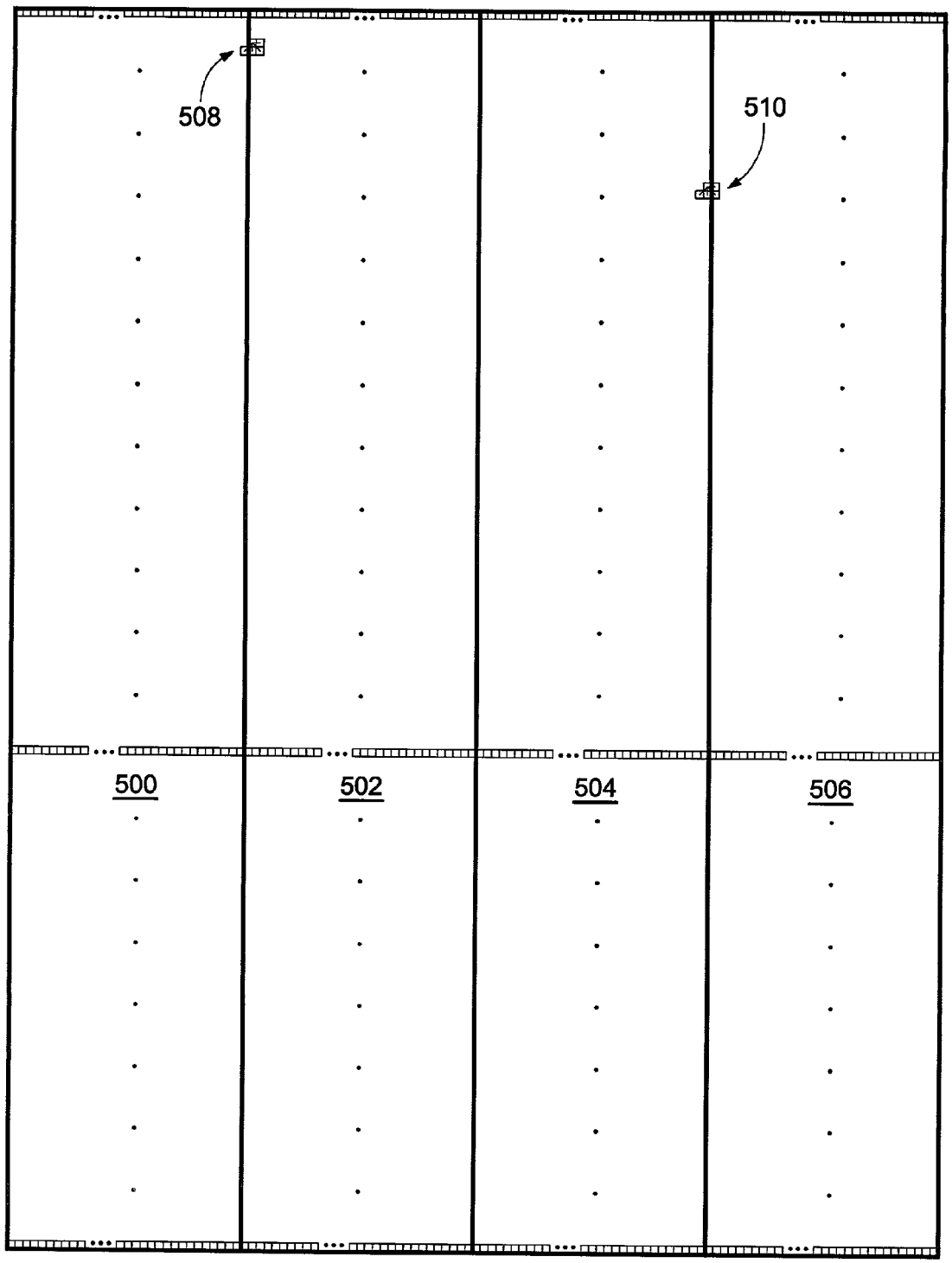

Shown in FIG. 5 is one possible division of an image into segments.

Figure 6:
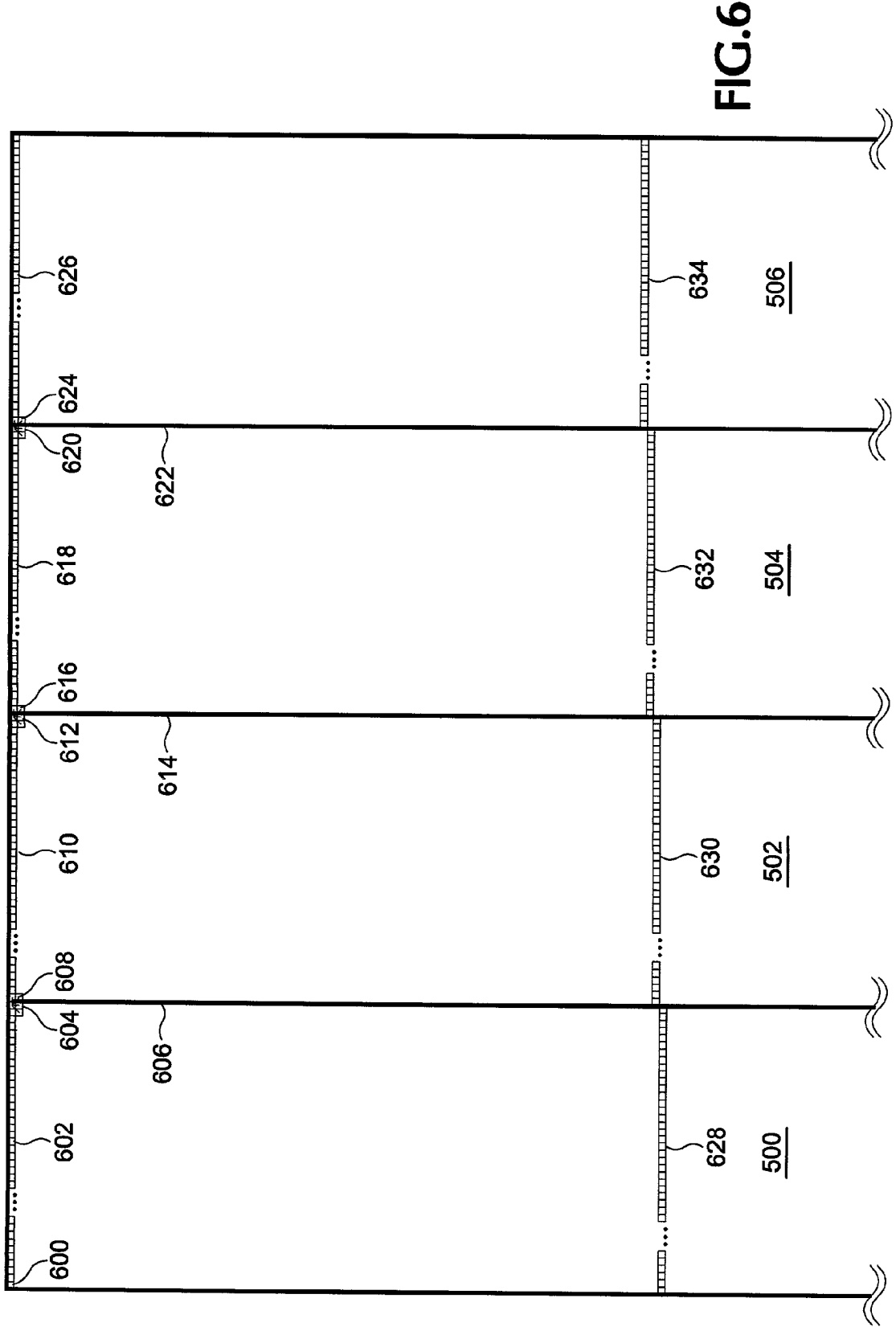

Shown in FIG. 6 is a portion of what is shown in FIG. 5 for the purpose of explaining how an embodiment of the processing system operates to perform an embodiment of an error diffusion halftoning process.

Figure 7:
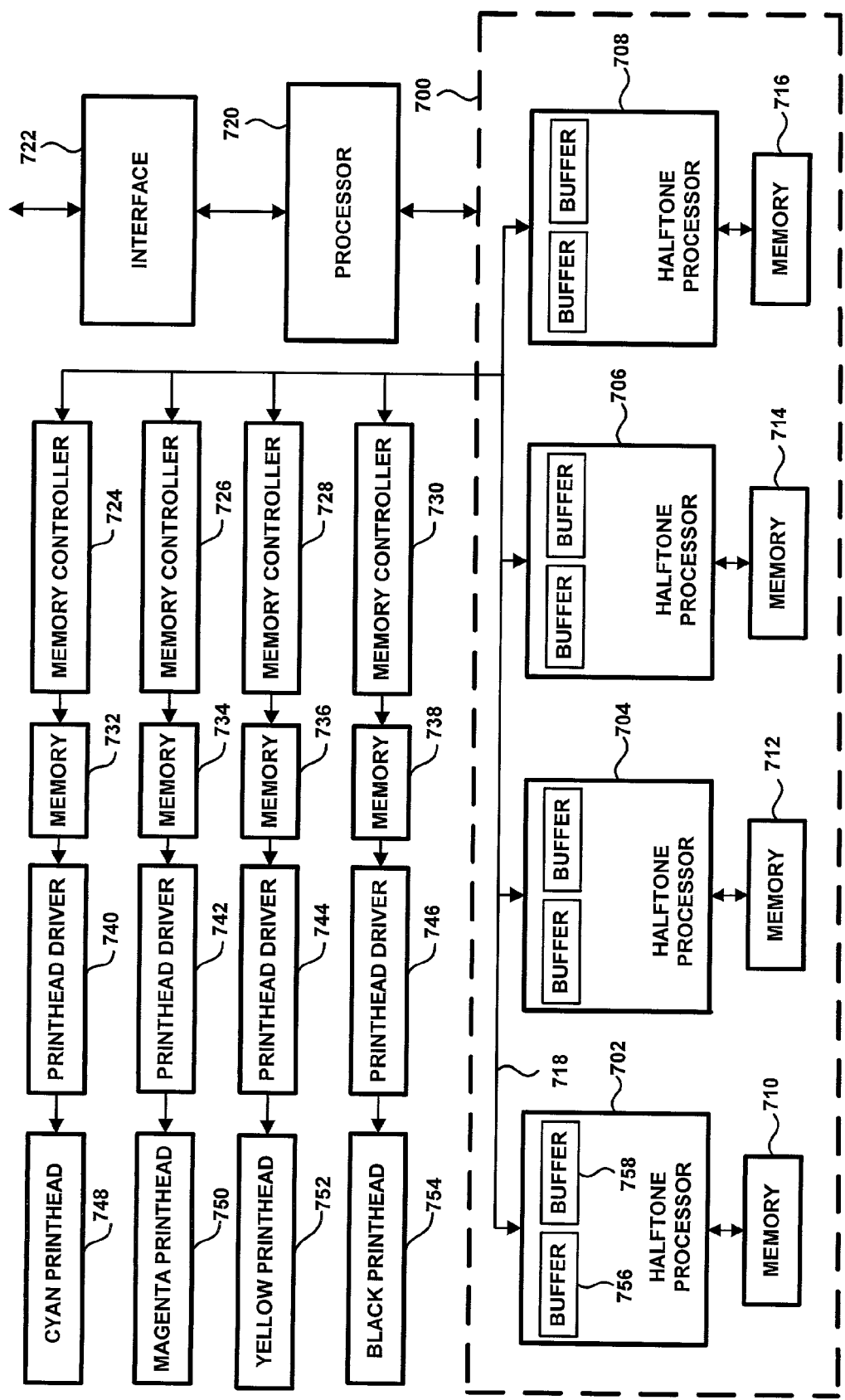

Shown in FIG. 7 is an embodiment of the processing system adapted for use in an imaging device.

Figure 8:
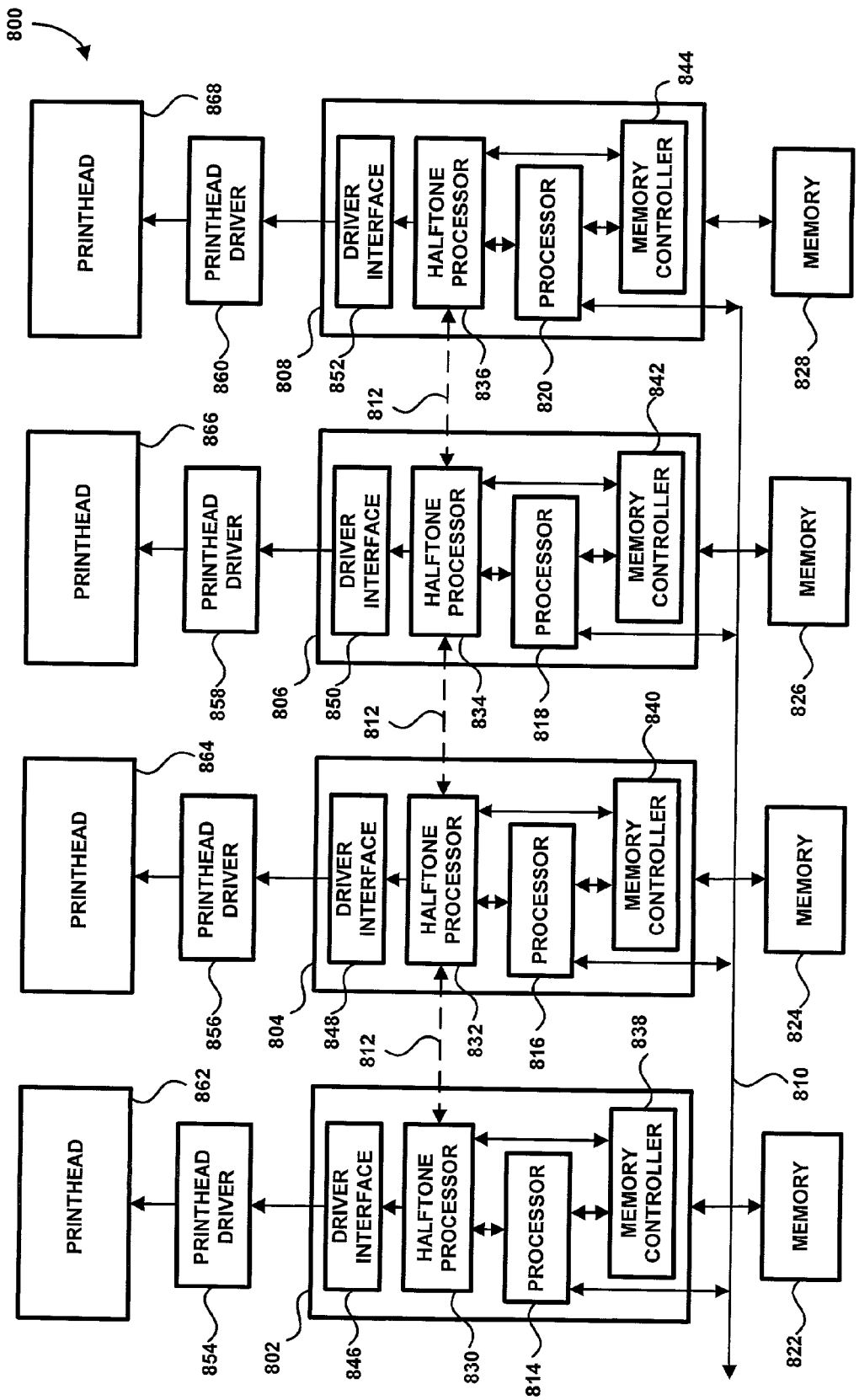

Shown in FIG. 8 is a simplified block diagram of an embodiment of the processing system adapted for use in an inkjet imaging device.

DETAILED DESCRIPTION OF THE DRAWINGS

Although embodiments of the processing system will be described in the context of an inkjet printer, it should be recognized that embodiments of the processing system could be usefully applied in other types of imaging devices such as electrophotographic printers, digital copiers, facsimile machines or the like. Furthermore, embodiments of the processing system may be usefully applied in other image processing applications. For example, image processing operations that perform the image processing on pixels using information from neighboring pixels could usefully apply the techniques disclosed in this specification.

Figure 1:
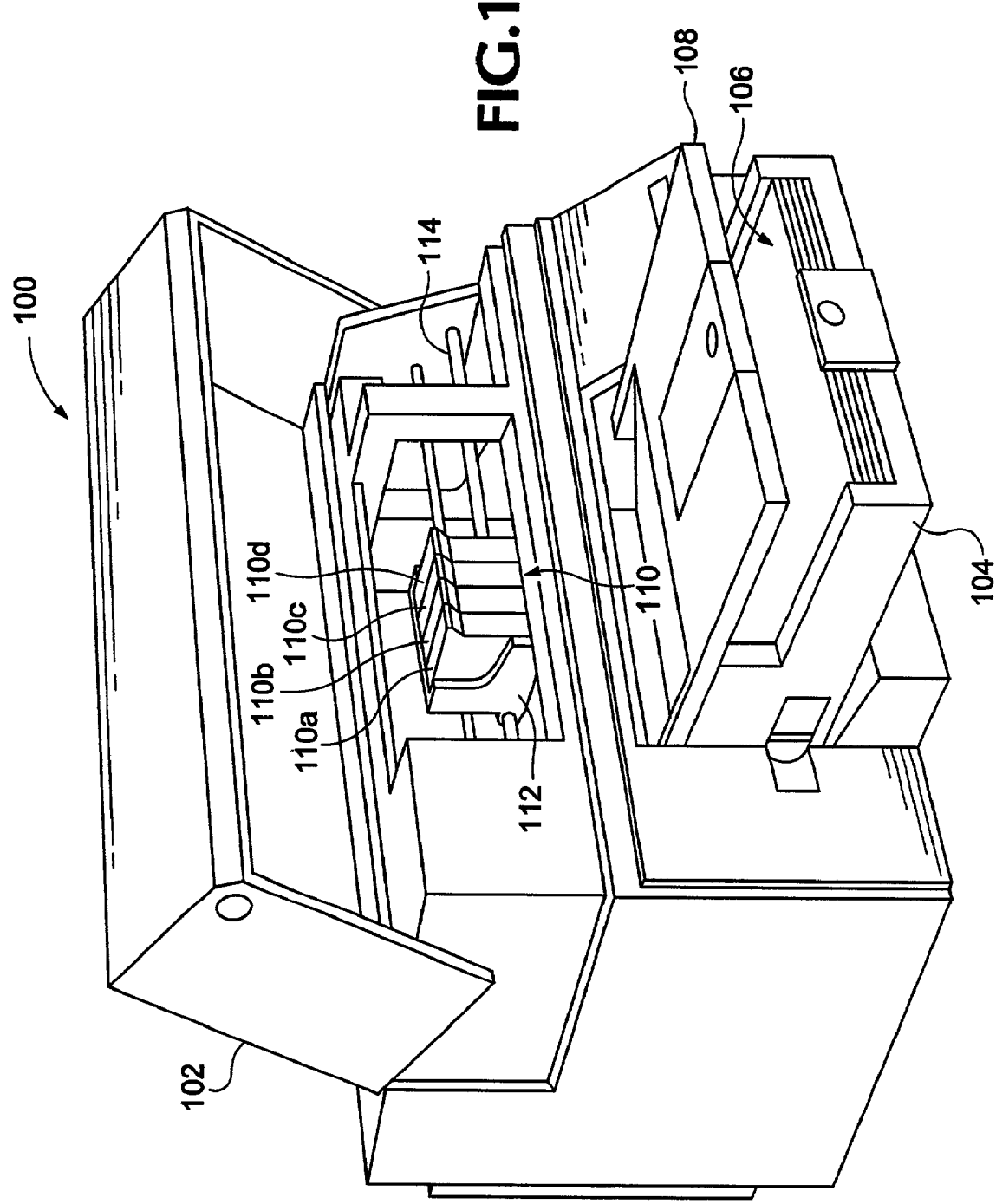

Shown in FIG. 1 is an embodiment of an imaging device, color inkjet printer 100, that includes circuitry forming an embodiment of the processing system. Color inkjet printer 100 includes a cover 102, a media input tray 104 for holding media 106 to be used in an imaging operation, a media output tray 108 for receiving the units of media 106 on which images have been formed, color ink cartridges 110 (including a cyan cartridge 110*a*, a magenta (M) cartridge 110*b*, a yellow (Y) cartridge 110*c*, and a black (K) cartridge 110*d*), and a scanning carriage 112 for sliding along a slide bar 114 while colorant from one or more of color cartridges 110 is placed onto pixels. In color inkjet printer 100, the colorant stored in color cartridges 110 includes ink.

Shown in FIG. 2 is a simplified block diagram representation of a system used for forming images on media 106. The system includes a computer 200. Computer 200 may execute an application program to generate data corresponding to an image displayed on monitor 202 (such as a CRT) or retrieve the data corresponding to the image from a storage device included within computer 200 through the application program. Typically, monitor 202 will display an image using an RGB color space and 24 bits (8 bits for each primary color) to specify the color value for each monitor pixel. An embodiment of an imaging device, printer 204 is coupled to computer 200. Printer 204 includes an embodiment of the processing system, halftoning apparatus 206 configured to generate halftone data from color values for the pixels forming the image.

Printer 204 may include color inkjet printer 100 or other types of printers such as an electrophotographic printer. Printer 204 includes the capability to form color images upon media 106 using a set of colorants (such as ink or toner) forming a color space (e.g. cyan, magenta, and yellow and optionally black). Printer 204 may be configured to form images at 300 dpi, 600 dpi, 1200 dpi, or other resolutions. A printer driver program that can execute in computer 200 converts the data (corresponding to the image) received from the application program into a form useable by printer 204, such as a page description language (PDL) file. The PDL file may include for example a file defined in HEWLETT PACKARD'S PCL-5 format.

Printer 204 renders the PDL file to generate pixel data including a color value for each pixel of each of the color planes forming the image. For example, an embodiment of printer 204 may generate color values for pixels forming the cyan, magenta, yellow, and black color planes. The color values for each of the pixels in the color planes may range, for example, from 0-255. An error diffusion type halftoning operation may be performed upon the color values of the color planes to generate halftone data for the image. The halftone data includes binary data specifying for each of the pixels in each of the color planes whether colorant for that color plane will be placed onto the pixel. For some types of inkjet printers, the quantity of the colorant is controlled by the number of drops of ink of a specific color placed onto the region of the media corresponding to the pixel. Other types of inkjet printers may control the quantity of the colorant by varying the mass of an ink drop of a specific color placed onto the region of the media corresponding to a pixel. For an electrophotographic printer, the quantity of the colorant is controlled by the fractional portion of the region on the photoconductor corresponding to the pixel that is exposed and developed.

Included in printer 204 is an embodiment of an image forming mechanism, imaging mechanism 208. Imaging mechanism 208 includes the hardware necessary to place colorant on media 106 according to the halftone data provided by halftoning apparatus 206. For example, in the case of an electrophotographic printer, imaging mechanism 208 may include a photoconductor, developing devices for developing cyan, magenta, yellow, and black toner (the colorants in this embodiment of imaging mechanism 208), a photoconductor exposure system for forming a latent electrostatic image on the photoconductor, a charging device for charging the photoconductor, a transfer device for transferring toner from the photoconductor to media 106, and a fixing device for fixing toner to media 106.

An embodiment of a controller, such as controller 210, coupled to imaging mechanism 208 controls the placement of colorant onto media 106 by imaging mechanism 208 making use of the halftone data for the pixels forming each of the color planes. The output from the printer driver software executing in computer 200 is passed through interface 212 to controller 210. Controller 210 includes the capability to render the PDL file received from computer 200 to generate pixel data for each of the pixels forming the image. Controller 210 includes an embodiment of a processing device, such as processor 214 configured to execute firmware or software, or an application specific integrated circuit (ASIC) for controlling the placement of colorant onto media 106 by imaging mechanism 208 according to the halftone data generated by halftoning apparatus 206. An embodiment of a memory device, such as memory 216, is coupled to processor 214 and stores halftone data or color values for the pixels forming the image.

Further detail on embodiments of imaging mechanisms used in color electrophotographic imaging devices can be found in U.S. Pat. No. 5,291,251, entitled IMAGE DEVELOPMENT AND TRANSFER APPARATUS WHICH UTILIZED AN INTERMEDIATE TRANSFER FILM, issued to Storlie et. al., and assigned to Hewlett-Packard Company, and U.S. Pat. No. 5,314,774, entitled METHOD AND APPARATUS FOR DEVELOPING COLOR IMAGES USING DRY TONERS AND AN INTERMEDIATE TRANSFER MEMBER, issued to Camis, and assigned to Hewlett-Packard Company. Each of these two patents is incorporated by reference in their entirety into this specification.

In the case of a color inkjet printer, imaging mechanism 208 may include ink cartridges mounted on a movable carriage with its position precisely controlled by a belt driven by a stepper motor. An ink cartridge driver circuit, coupled to the controller and the ink cartridges, fires nozzles in the ink cartridges based upon signals received from the controller to place colorant on media 106 according to the halftone data or color values for the pixels forming each of the color planes. Further detail on embodiments of imaging mechanisms used in color inkjet printers can be found in U.S. Pat. No. 6,082,854, entitled MODULAR INK-JET HARD COPY APPARATUS AND METHODOLOGY, issued to Axtell et al., and assigned to Hewlett-Packard Company, and U.S. Pat. No. 5,399,039, entitled INK-JET PRINTER WITH PRECISE PRINT ZONE MEDIA CONTROL, issued to Giles et al., and assigned to Hewlett-Packard Company. Each of these two patents is incorporated by reference in their entirety into this specification.

Shown in FIG. 3 is a high level flow diagram of a method for forming an image on media using the system of FIG. 2. First, in step 300, a user creates data (or retrieves data) corresponding to an image on monitor 202 using the application program executing in computer 200. Next, in step 302, the user initiates execution of the printer driver program residing in computer 200 through the application program to begin the imaging operation. Then, in step 304, the driver program converts the data into a PDL file including image data useable by printer 204. The image data corresponds to the image on monitor 202 and is expressed in the RGB color space. Next, in step 306, the PDL file is rendered to generate pixel data for each pixel for the R, G, and B color planes. The pixel data includes color values for each pixel. It should be recognized that the rendering operation may be performed in computer 200 or in printer 204. Then, in step 308, a color space conversion is performed to convert the color values for each pixel in the R, G, and B color planes into color values for each pixel in the C, M, Y, and K planes. It should be recognized that although the method for forming an image is discussed in the context of printer 204 making use of cyan, magenta, yellow, and black colorants to form images, embodiments of the processing system could be usefully applied in imaging devices that use other types of colorants to form images. For example, embodiments of the processing system could be used in inkjet imaging devices that make use of low dye load cyan colorant and low dye load magenta colorant. Or, embodiments of the processing system could be used in imaging devices that make use of orange colorant and green colorant in addition to other colorants.

Next, in step 310, an embodiment of an error diffusion halftoning method is applied to the color values for the pixels in the C, M, Y, and K planes forming the image to generate halftone data. The halftone data indicates for every pixel in the image, in a binary or multi-bit fashion, whether each of the cyan, magenta, yellow, or black colorants are to be applied to the pixel and, if it is multi-bit halftone data, the halftone data indicates a quantity of colorant to be placed onto the pixel. Finally, in step 312, the image is formed on media 106 by printer 204 using the halftone data.

The halftoning operation mentioned in step 310 is performed for each pixel and each color plane forming the image. For each pixel, the color value for the color plane upon which halftoning is performed is compared to a predetermined value. The predetermined value may be the same for each pixel in the image or the predetermined value may be one value in a matrix of predetermined values, commonly known as a threshold matrix. If a threshold matrix is used, it is applied repetitively across the pixels in the image so that each pixel forming the image is compared to one value in the threshold matrix. Use of a properly designed threshold matrix improves the quality of the resulting image.

The comparison between the pixel color value for a color plane includes subtracting the corresponding threshold value in the threshold matrix (or if the error diffusion is performed without using a threshold matrix, subtracting the threshold value) from the pixel color value. If the pixel color value is greater than or equal to the threshold value, colorant for that color plane will be placed onto the pixel. If it is a multi-bit halftoning operation, the quantity of the colorant placed onto the pixel is set based upon the magnitude of the difference between the pixel color value and the threshold value and a corresponding multi-bit value is stored for the pixel in the corresponding halftone color plane. The number of levels of the quantity of the colorant that can be placed onto the pixel depends upon the capability of the embodiment of the imaging mechanism. For example, some embodiments of imaging mechanisms have the capability to place up to 4 drops of a single colorant onto a pixel. Multi-bit halftoning operations used with this type of inkjet imaging mechanism would use 2 bits to specify the quantity of colorant placed on a pixel for each color plane, allowing 4 levels of a colorant (corresponding to 0, 1, 2, or 4 drops) to be placed on a pixel. If the imaging mechanism operates in a binary fashion to either place or not place a substantially constant quantity of a colorant onto a pixel, a single bit is used for each pixel in the halftone color plane to specify whether or not colorant is to be placed on the pixel.

Shown in FIG. 4 is a simplified diagram showing how an exemplary error diffusion halftoning operation that could be used for step 310 is performed. Each of the squares shown in FIG. 4, of which square 400 is representative, corresponds to a pixel. The arrows shown in FIG. 4 represent how the error value associated with the application of the halftoning operation to square 400 are distributed to nearby pixels. The error value associated with a pixel is computed differently depending upon whether a single bit or multi-bit halftoning operation is performed.

In a single bit halftoning operation, if the color value (of the color plane on which halftoning is performed) is less than the threshold value, the colorant for the halftoned color plane will not be placed on the pixel. The error value distributed over the near pixels (as shown by arrows 402, 404, 406, and 408) equals the color value of the pixel added to the cumulative error value received for the pixel from other pixels. If the color value is greater than the threshold value, the error value distributed over the near pixels equals the maximum color value (255 for 8 bit color values) subtracted from the color value, yielding a negative value for the error.

In a multi-bit halftoning operation that uses 4 possible levels of the colorant (for example, 0 drops of ink, 1 drop of ink, 2 drops of ink, and 4 drops of ink), the color value and the error value received from surrounding pixels are used to determine which of the 4 possible levels of colorant to place onto the pixel. The determination is done according to where the combination of the color value and the error value lie relative to ranges defined by breakpoint values. For example, one set of breakpoint values could be at color values 0, 63, 127, and 191 (for a system using 8 bits per pixel for each color) corresponding, respectively, to the first, second, third, and fourth levels of colorant. An error value for diffusion to other pixels is determined using the difference between the error value combined with the color value for that pixel and the breakpoint value at the beginning of the range in which the error value combined with the color value lie. Further details about implementations of multi-bit halftoning are disclosed in U.S. Pat. No. 6,057,933, incorporated by reference in its entirety into this specification.

The partition of the error values (where the errors are determined in an exemplary fashion in the previous paragraphs for single or multi-bit halftoning) between the near pixels (to which arrows 402, 404, 406, and 408 are directed) are not necessarily equal. The fractional portions of the error value that are distributed to the near pixels is referred to as the error diffusion filter. One possible error diffusion filter, known as the Floyd-Steinberg algorithm, associates a factor of $\frac{3}{16}$ with arrow 402, a factor of $\frac{5}{16}$ with arrow 404, a factor of $\frac{1}{16}$ with arrow 406, and a factor of $\frac{7}{16}$ with arrow 408. It should be recognized that other distributions of the error value to nearby pixels may be used. For example, an error diffusion halftoning process of less computational intensity involves distributing the error value equally over two near pixels (referred to as fast error diffusion). As can be seen from FIG. 4, performing error diffusion halftoning processes involves computation of error terms before many pixels forming the image can be halftoned. The time to perform error diffusion type halftoning processes can be reduced if the processing upon the pixels forming the image is segmented and performed in so that the processing of the segments overlaps in time. To perform the error diffusion halftoning processes in this fashion involves the transfer of error terms (which have been modified by application of the error diffusion filter to the error values) across the boundaries between the segments of pixels into which the image is divided. To allow processing on a segment more quickly, it would be useful to make the error terms available to pixels across the boundaries of segments so that when processing begins on the pixels adjacent to the boundary the error terms are available.

Shown in FIG. 5 is a partitioning of pixels that form an image on a unit of media useful for reducing the time required to perform an error diffusion type halftoning operation. For ease of illustration, the pixels shown in FIG. 5 are of larger size in proportion to the page than in actuality. By dividing the pixels forming the image into segments and performing an error diffusion halftoning process on the segments in a way that overlaps in time, the time required to complete an error diffusion halftoning process is reduced with respect to performing the error diffusion halftoning process without dividing the pixels into segments. Although FIG. 5 illustrates the division of the pixels forming the image into four segments such as, first column 500, second column 502, third column 504, and fourth column 506, it should be recognized that the pixels forming the image could be divided into a greater or fewer number of segments. By dividing the pixels forming the image into a different number of segments the speed with which an error diffusion halftoning process can be performed may be scaled. For a relatively more rapid completion, a relatively large number of segments are used. A larger number of segments makes use of more hardware to perform the processing with time overlap than a smaller number of segments.

Although the axes along which the image is segmented in FIG. 5 correspond to what would be the vertical direction for an image with a portrait orientation, it should be recognized that the segmentation techniques could be applied for other orientations, such as the landscape orientation. A variety of divisions of the pixels forming the image could be used, where the direction on the image in which the pixels forming the image are processed for an error diffusion halftoning operation is perpendicular to the primary direction in which the image is divided into segments. For example, the boundary formed between segments could be an irregularly shaped partition of the pixels instead of a segmentation that forms the boundary between segments along a row or column of pixels. It should be further recognized that although segmentation of the pixels is discussed in the context of segments having the same shape and the same number of pixels, the segments may be formed to contain a different number of pixels. As can be seen by reference to FIG. 5, an error diffusion halftoning operation is performed from left to right across lines of pixels in a horizontal direction and the division of the image into segments is done vertically. Pixel group 508 and pixel group 510 illustrate the distribution of error terms across segment boundaries. Although FIG. 5 shows an error diffusion halftoning process performed from left to right and top to bottom, it should be recognized that the techniques disclosed in this written description could be applied to perform an error diffusion halftoning process in a different order. For example, with appropriate modification, the disclosed techniques could be applied to perform the error diffusion halftoning right to left and top to bottom, left to right and bottom to top, or right to left and bottom to top.

Although the techniques disclosed in this written description may be usefully applied for reducing the time for performing an error diffusion halftoning process in many different types of imaging devices, they are particularly useful for inkjet imaging devices that have the capability to form images using multiple printheads that span the width of a unit of media, a so called page wide array format. In a page wide array format, the image is divided into columns across the dimension of the media substantially perpendicular to the direction of movement of the media through the imaging device. Using the multiple printheads spanning the width of the image allows colorant to be rapidly placed onto media for each of the color planes. The printheads could be configured so that within a column, the colorant for the color planes forming the image are placed on the media in succession as the media moves through the media path. With this configuration, the processing of the color values for the C, M, Y, and K planes to generate the drive signals can be done substantially separately for the pixels forming each column of the image. The capability to process the color values for pixels in different columns in a substantially separate manner improves the efficiency of processing operations and permits scaling of the design to have a greater or fewer number of printheads across the width of the media without an extensive redesign of the imaging device.

One way in which an error diffusion halftoning operation corresponding to FIG. 5 can be implemented involves the use of four Application Specific Integrated Circuits (ASICs) that each perform the error diffusion halftoning operation on one of the four columns shown in FIG. 5. Performing an error diffusion halftoning operation according to the division of the pixels shown in FIG. 5 will involve the transfer of error terms between pixels on opposite sides of the boundaries between the columns. In the four ASIC implementation, the transfer of error terms across boundaries between the columns corresponds to the transfer of error terms between the ASICs. The number of error terms that will be transferred across the boundary depends upon the specific implementation of the error diffusion halftoning operation used. For example, for an error diffusion halftoning operation of a type corresponding to FIG. 4 (where computation is performed moving left to right and top to bottom), three error terms are transferred across the boundary for the halftoning of most pixels along the boundary. The three error terms originate from halftoning a pixel adjacent to the left side of the boundary and from halftoning a pixel adjacent to the right side of the boundary. Two of the three error terms originate from halftoning the pixel adjacent to the left side of the boundary. These two error terms will be used to halftone the pixel on the same line adjacent to the right side of the boundary and to halftone the pixel on the next line down the image adjacent to the right side of the boundary. One of the error terms that crosses the boundary will be used to halftone the pixel the next line down the image adjacent to the left side of the boundary. It should be recognized that different types of error diffusion halftoning operations will involve different numbers of error terms transferred across the boundary for each pixel. For example, for an error diffusion halftoning operation that distributes the error to pixels beyond those adjacent to the pixel upon which halftoning is performed, a greater number of values will be transferred across the boundary for each pixel adjacent to the boundary.

Consider the case for which the error diffusion halftoning operation corresponding to FIG. 5 is performed. The halftoning operation is performed moving left to right within a line and top to bottom line by line. The pixels on the top edge, bottom edge, left edge, and right edge of the image are treated differently in the halftone computation than those forming the interior of the image. As can be seen from FIG. 4, because some of the pixels are located on the edges, they will either not be the source of the same number of error terms (for use in halftoning other pixels) as pixels on the interior or receive the same number of error terms as pixels on the interior. The error diffusion halftoning operation accounts for the special treatment of the pixels on the edge.

As previously mentioned, the error diffusion halftoning operation corresponding to FIG. 5 is performed with substantial time overlap on the processing of the segments to reduce the time to complete the halftoning operation. To further reduce the time for performing the halftoning operation it would be useful to coordinate the performance of the halftoning operation on the segments so that the values that are to be transferred across the boundaries between the segments are available slightly before the time when the pixels on the boundaries between the segments undergo halftoning. Shown in FIG. 6 are portions of first column 500, second column 502, third column 504, and fourth column 506 illustrating how the timing of the start of the processing of the lines of pixels across the width of the columns is adjusted to accomplish the transfer of error terms between segments in a way that reduces delay in performing the error diffusion halftoning operation. In FIG. 6 the halftone processing of the lines in first column 500, second column 502, third column 504, and fourth column 506 is started so that each of the columns moving left to right across the image has a successively later start time. Halftone processing is started first on the left-most pixel 600 in the line 602 of pixels of first column 500. When the right-most pixel 604 of line 602 is halftoned, four error terms are generated. Two of the four error terms from pixel 604 are transferred across boundary 606 for use in halftoning of the left-most pixel 608 of line 610 in second column 502 and the pixel below that in second column 502. With the error term available for pixel 608, halftone processing can begin on line 610. Two of the four error terms are used in the halftone processing of the line below line 602 in column 500. After completion of the halftoning of right-most pixel 612 of line 610, two error terms are transferred across boundary 614 for use in halftoning of left-most pixel 616 of line 618 and the pixel below it in third column 504. With the error term for pixel 616 available, halftone processing of line 618 can begin. After completion of the halftoning of right-most pixel 620 of line 618, two errors term are transferred across boundary 622 for use in halftoning of right-most pixel 624 of line 626 and the pixel below it in fourth column 506. With the error term for pixel 624 available, halftone processing of line 626 can begin. After halftone processing of line 626 is started, the halftoning operation is subsequently proceeds down each of first column 500, second column 502, third column 504, and fourth column 506. Halftone processing of the lines of pixels in the columns is started in a time staggered fashion (that is, line 602, followed by line 610, followed by line 618, followed by line 626) so that error terms are available for halftone process. Because of this, the halftone processing down first column 500, second column 502, third column 504, and fourth column 506 proceeds so that there is an offset of one line in the halftone processing between the columns. This is illustrated in FIG. 6 by the one line offset in halftone processing across the columns for lines 628, 630, 632, and 634. Halftone processing on each of these lines is started at substantially the same time.

Halftone process is performed on each of the columns contemporaneously until right-most pixel of the last line of column 500 is halftoned. Then, after the halftoning operation is completed on column 500, halftoning operations are completed on column 502, column 504, and column 506 in succession as the last lines in the columns are completed. By performing the halftoning operation on column 500, column 502, column 504, and column 506 in the manner described, the error terms used for processing the right-most pixels in the columns adjacent to boundaries are available when processing of the line begins so that additional time is not added to perform the halftoning operation on the columns.

Shown in FIG. 7 is a simplified block diagram of an embodiment of a halftoning apparatus, halftoning device 700. Halftoning device 700 is configured to perform an error diffusion halftoning operation on color planes forming an image. Halftoning device 700 includes embodiments of processing devices, such as halftone processor 702, halftone processor 704, halftone processor 706, and halftone processor 708. It should be recognized that although halftoning device 700 makes use of four halftone processors for performing error diffusion halftoning, a greater number or fewer number of halftone processors could be used. For example, to reduce the amount of hardware, two halftone processors could be used to perform error diffusion halftoning on an image partitioned into two segments. Or, five halftone processors could be used to perform error diffusion halftoning on an image partitioned into five segments. In general the more halftone processors used, the more rapidly the error diffusion halftoning operation can be performed. The halftone processors could include ASICs designed to perform an embodiment of an error diffusion halftoning process. Or, the halftone processors could include microprocessors executing firmware to perform an embodiment of an error diffusion halftoning process. Previously developed error diffusion halftoning hardware designs are available in the industry for incorporation into each of halftone processors 702-708. Each of halftone processors 702-708 includes a configuration to perform an embodiment of an error diffusion halftoning operation on a segment of an image for each of the color planes. For example, halftone processors 702-708 could be configured to perform a single bit error diffusion halftoning operation or a multi-bit error diffusion halftoning operation. Memories, 710-716 store the data used in performing the embodiment of the halftoning operation. An embodiment of a communication path, such as bus 718, allows each of halftone processors 702-708 to send or receive data, address, and control signals between halftone processors 702-708 and between devices external to halftoning device 700. The color values for the segments are transferred by processor 720 over bus 718 to halftone processors 702-708 and into the respective memories 710-716. The image data from which processor 720 generates the color values is received through interface 722. The color values for the segments are transferred line by line, as needed, into halftone processors 702-708 from, respectively, memories 710-716 to perform the error diffusion halftoning operation on the color values. After the error diffusion halftoning operation is complete, the resulting halftone data is transferred over bus 718 to memory controllers 724-730, according to the color plane to which the halftone data corresponds (either cyan, magenta, yellow, or black), and into memories 732-738. Using the halftone data stored in memories 732-738, printhead drivers 740-746 generate the drive signals necessary to cause the corresponding cyan printhead 748, magenta printhead 750, yellow printhead 752, and black printhead 754 to eject the amount of ink onto the media corresponding to the halftone data.

Halftone processors 702-708 include input buffers and output buffers, of which input buffer 756 and output buffer 758 are representative, to store error terms associated with performing the halftoning operation on pixels located adjacent to boundaries between segments. The input buffers and the output buffers included in each of halftone processors 702-708 are selected to have sufficient capacity to hold the number of error terms transferred across the boundaries of the segment for the particular embodiment of the error diffusion halftoning process implemented. The timely transfer of these error terms over bus 718 permits halftone processing of the pixels in the segments handled by different ones of halftone processors 702-708 without waiting for the generation of these error terms. Halftone processors 704-708 are each configured to use the error terms received into their respective input buffers for halftone processing of the color values associated with the left-most pixels adjacent to the boundaries. In addition, halftone processors 702-706 are each configured to store, into their respective output buffers, error terms generated from the halftone processing of the color values associated with the right-most pixels adjacent to the boundaries. The configuring of halftone processors 702-

708 to operate in this manner is performed by a processing device, such as processor 720, coupled to bus 718 and located external to halftoning device 700. Alternatively, the hardware to perform configuration of halftone processors 702-708 could be designed into the hardware of halftone processors 702-708, or performed under the control of firmware operating in halftone processors 702-708. Bus 718 may utilize one of a wide variety of transfer protocols. For example a PCI bus could be used for an embodiment of bus 718. In halftoning device 700, a PCI bus could be employed to allow for rapid transfer of a large amount of halftone data and color values from halftone processors 702-708 to memory controllers 724-730, where halftone processors 702-708 include the capability to perform as bus masters. In addition, this PCI bus could be used to transfer error terms between halftone processors 702-708. However, the disclosed division of the error diffusion halftoning operations between halftone processors 702-708 allows for performance of the halftoning operations within halftone processors 702-708 without transferring large amounts of data between them. Therefore, a type of bus having much lower bandwidth than a PCI bus could be used for transferring error terms between halftone processors 702-708. For example, a serial bus, or a lower bandwidth parallel bus, separate from the one used to transfer color values and halftone data, could be usefully applied to transfer error terms between halftone processors 702-708. This lower bandwidth type bus could be implemented so that it is connected between ones of halftone processors 702-708 that perform halftone processing on adjacent segments of the image but is not connected between ones of halftone processors 702-708 that perform halftone processing on non-adjacent segments.

Although the disclosed embodiment of the error diffusion halftoning process operating with halftoning device 700 distributes error terms to a single layer of pixels surrounding the pixel upon which the halftoning operation is performed, it should be recognized that a modification to halftoning device 700 would permit the use of an embodiment of an error diffusion halftoning process that distributes error terms to multiple layers of pixels. The modification includes additional input and output buffers to hold error terms and additional hardware or firmware to manage the transfer of data to and from these buffers in preparation for halftoning successive lines in the columns.

Certain area treatments are applied to regions of pixels forming the image to enhance image quality. One example of an area treatment that could be applied to regions of an image is edge enhancement. In the edge enhancement, color values are modified for pixels determined to lie on an edge of an object within the image to enhance the sharpness of the edge. Part of applying the area treatment involves determining if an edge of an object in the image has been encountered. Consider the case in which an edge of an object lies on pixels on the boundary between segments of the image formed for the purpose of more rapidly performing the halftone processing operation. To determine if this pixel does in fact correspond to an edge of the object, color values for adjacent pixels are examined. The adjacent pixels examined may correspond to regions of the image within the adjacent segment.

In embodiments of imaging devices in which the pixels are divided into segments for improving the speed of performing halftoning, it is also helpful to partition the performance of the area treatments according to the division of the pixels into segments for the halftoning operation. However, to account for the case in which an edge of an object lies on pixels at a boundary between segments, the pixels forming segments are selected so that there is overlap of the segments. Although some redundant processing of pixels will occur (for example duplication of the halftoning operation), edge enhancement area treatments can be performed on each segment without the need to transfer a large amount of data between segments.

To implement processing of the color values in this manner, the hardware and firmware of the embodiment of the halftoning apparatus used would be configured to perform a halftoning operation on pixels of the adjacent segments which are adjacent to the boundary of the segment undergoing halftoning. In addition, the hardware and firmware would be configured to generate and use error terms for pixels in adjacent segments. Halftoning device 700 could be modified to perform the halftoning operation in this manner by having a configuration to load color values from pixels of adjacent segments and transfer the needed error terms to and from the buffers.

Shown in FIG. 8 is high level block diagram of an embodiment of an imaging device, inkjet printer 800, that includes an embodiment of a halftoning apparatus. Inkjet printer 800 is adapted for use in a page wide array configured imaging device. As previously mentioned, in a page wide array imaging device multiple printheads are used to span the width of a unit of media. By partitioning the image processing functions performed on the data defining the image to be formed, the time used for forming the image can be reduced. Inkjet printer 800 includes processing blocks, processing block 802, processing block 804, processing block 806, and processing block 808. Each of the processing blocks includes substantially the same hardware. An embodiment of a bus, such as bus 810 allows each of the processing blocks to receive image data and transmit and receive control signals. In addition bus 810 is used for transferring data between processing blocks as necessary for performing the image processing functions. As previously mentioned, because each of the processing blocks operates on segments of pixels forming the image, the transfer of data between the processing blocks is not substantial. Specifically, the error terms resulting from the halftone processing that are transferred between the processing blocks are from pixels near the boundary between the segments. Because of this, bus 810 is used for a relatively small percentage of the time for the transfer of error terms between processing blocks. It should be recognized that, alternatively, dedicated low bandwidth buses (corresponding to dashed lines 812), separate from bus 810, could be used to transfer the error terms between processing blocks that operate on the color values corresponding to pixels in adjacent segments.

Processors 814-820 perform, for their respective processing blocks, functions related to image processing such as decompression of compressed image data, color space conversion, configuration of the other functional blocks within the processing block, and interface functions between bus 810 and embodiments of a memory device, memories 822-828. Halftone processors 830-836 perform embodiments of error diffusion halftoning operations on color values received from, respectively, processors 814-820 as previously described. Error terms from the halftone processing of values corresponding to pixels near the boundaries between the segments are transferred between halftone processors 830-836 on bus 810 as needed. Memory controllers 838-844 control the movement of data between the corresponding memories 822-828 and corresponding processors 814-820 and between corresponding memories 822-828 and corresponding halftone processors 830-836. Driver interfaces 846-852 use the output from, respectively, halftone processors 830-836, to generate print data. The print data generated by driver interfaces 846-852 is used, respectively, by printhead drivers 854-860 to generate signals for firing nozzles within, respectively, printheads 862-868 to form an image corresponding to the image data on the media.

Printheads 862-868 may be configured so that there is overlap in their pixel coverage to reduce artifacts in the resulting image. For example each of printheads 862-868 could be positioned and include sufficient nozzles so that it can eject ink onto one pixel of each of the segments (or segment) to which it is adjacent. Between adjacent printheads, this would result in two pixels of overlap in the processing. Accomplishing the overlap in error diffusion halftone processing would involve providing the color values for pixels within one segment that are adjacent to the boundary with an adjacent segment to the processing block processing the adjacent segment so that the error diffusion halftoning operation could be performed on these pixels. In addition, the error terms used to for performing error diffusion halftoning on the pixels in the overlap region would be transferred between processing blocks operating upon adjacent segments.

Although embodiments of the processing system and its method of operation have been illustrated, and described, it is readily apparent to those of ordinary skill in the art that various modifications may be made to these embodiments without departing from the scope of the appended claims.

What is claimed is:

1. A method, comprising:
transferring a first plurality values, corresponding to a first one of a plurality of rows of pixels in a first one of a plurality of segments of pixels included in a group of pixels, over a first bus to a first processing device;
halftoning the first plurality of values to form a first plurality of error terms using the first processing device;
transferring at least one of the first plurality of error terms over a second bus to a second processing device, with the second bus having a lower maximum transfer rate than the first bus; and
halftoning, using the at least one of the first plurality of error terms, on a second plurality of values corresponding to a second one of the plurality of rows in a second one of the plurality of segments using the second processing device.

2. The method as recited in claim 1, wherein:
the first one of the plurality of segments and the second one of the plurality of segments include equal numbers of the pixels.

3. The method as recited in claim 1, wherein:
the first one of the plurality of segments exists adjacent to the second one of the plurality of segments within an image formed by the plurality of segments; and
a boundary at an interface between the first one of the plurality of segments and the second one of the plurality of segments forms a substantially straight line within the image.

4. The method as recited in claim 3, wherein:
the boundary exists substantially perpendicular to the plurality of rows of the pixels.

5. The method as recited in claim 1, wherein:
the first one of the plurality of rows and the second one of the plurality of rows exist in alignment within the image.

6. The method as recited in claim 1, wherein:
the halftoning includes error diffusion halftoning.

7. The method as recited in claim 1, wherein:
halftoning of ones of the plurality of rows in the first one of the plurality of segments, other than the first one of the plurality of rows, occurs contemporaneously with halftoning of ones of the plurality of rows in the second one of the plurality of segments, other than the second one of the plurality of rows.

8. The method as recited in claim 1, wherein:
the first one of the plurality of segments includes ones of the pixels included in the second one of the plurality of segments.

9. An apparatus, comprising:
a first processing device to perform halftoning on a first set of values received over a first bus and corresponding to a first set of pixels;
a second processing device to perform halftoning on a second set of values corresponding to a second set of pixels with ones of the first set of pixels located adjacent to the second set of pixels and with ones of the second set of pixels located adjacent to the first set of pixels; and
a second bus arranged for transferring a third set of values, from the halftoning of ones of the first set of values corresponding to the ones of the first set of pixels, to the second processing device and for transferring a fourth set of values, from the halftoning of ones of second set of values corresponding to the ones of the second set of pixels, to the first processing device, with the second bus having a lower maximum transfer rate than the first bus.

10. The apparatus as recited in claim 9, wherein:
the halftoning includes error diffusion halftoning.

11. The apparatus as recited in claim 10, wherein:
the third set of values includes error terms generated from the error diffusion halftoning of the ones of the first set of pixels; and
the fourth set of values includes error terms generated from the error diffusion halftoning of the ones of the second set of pixels.

12. The apparatus as recited in claim 11, wherein:
the first set of pixels and the second set of pixels each include equal numbers of the pixels, with the first set of pixels and the second set of pixels included within an image; and
with the ones of the first set of pixels adjacent to tho ones of the second set of pixels within the image.

13. The apparatus as recited in claim 12, wherein:
a boundary at an interface between the ones of the first set of pixels and the ones of the second set of pixels forms a substantially straight line within the image.

14. The apparatus as recited in claim 13, wherein:
the first set of pixels includes a spatial arrangement into a first plurality of rows forming a first segment of the image; and
the second set of pixels includes a spatial arrangement into a second plurality of rows forming a second segment of the image, with the ones of the first set of pixels forming a first column adjacent to a second column formed from the ones of the second set of pixels, with the boundary at the interface between the first column and the second column.

15. The apparatus as recited in claim 14, wherein:
the first plurality of rows includes a first row located on a first edge of the first column and the second plurality of rows includes a second row located on a second edge of the second column, with the first row aligned with the second row in the image; and the first processing device includes a configuration to complete the error diffusion halftoning on the first row before the second processing device begins the error diffusion halftoning on the second row.

16. The apparatus as recited in claim 15, wherein:

the first plurality of rows includes a third row located adjacent to the first row in the first column;

the second plurality of rows includes a fourth row located adjacent to the second row in the second column;

the second processing device includes a configuration to begin the error diffusion halftoning on the second row before the first processing device completes the error diffusion halftoning on the third row; and the first processing device includes a configuration to complete the error diffusion halftoning on the third row before the second processing device begins the error diffusion halftoning on the fourth row.

17. The apparatus as recited in claim 16, wherein:

the first processing device includes a first halftone processor and the second processing device includes a second halftone processor.

18. The apparatus as recited in claim 9, wherein:

the halftoning includes error diffusion halftoning.

19. The apparatus as recited in claim 18 further comprising:

a third processing device to perform halftoning on a fifth set of values corresponding to a third set of pixels; and a fourth processing device to perform halftoning on a sixth set of values corresponding to a fourth set of pixels, with ones of the third set of pixels located adjacent to the fourth set of pixels, with ones of the fourth set of pixels located adjacent to the third set of pixels, and with the bus coupled to the third processing device and the fourth processing device for transferring a seventh set of values, from the halftoning of the ones of the third set of pixels to the fourth processing device, and for transferring an eighth set of values, from the halftoning of the ones of the fourth set of pixels, to the third processing device.

20. The apparatus as recited in claim 19 wherein:

the third set of values includes error terms generated from the error diffusion halftoning of the ones of the first set of pixels;

the fourth set of values includes error terms generated from the error diffusion halftoning of the ones of the second set of pixels;

the seventh set of values includes error terms generated from the error diffusion halftoning of the ones of the third set of pixels; and the eighth set of values includes error terms generated from the error diffusion halftoning of the ones of the fourth set of pixels.

21. The apparatus as recited in claim 20, wherein:

the first set of pixels, the second set of pixels, the third set of pixels, and the fourth set of pixels each include equal numbers of pixels, with the first set of pixels, the second set of pixels, the third set of pixels, and the fourth set of pixels included within an image.

22. The apparatus as recited in claim 21, wherein:

a first boundary formed at a first interface between the ones of the first set of pixels and the ones of the second set of pixels forms a substantially straight line within the image; and a second boundary formed at a second interface between the ones of the third set of pixels and the ones of the fourth set of pixels forms the substantially straight line within the image.

23. The apparatus as recited in claim 22, wherein:

the first set of pixels includes a spatial arrangement into a first plurality of rows forming the first column;

the second set of pixels includes a spatial arrangement into a second plurality of rows forming the second column, with the ones of the first set of pixels forming the first column adjacent to the second column formed from the ones of the second set of pixels, with the first boundary at the interface between the first column and the second column;

the third set of pixels includes a spatial arrangement into a third plurality of rows forming a third column; and the fourth set of pixels includes a spatial arrangement into a fourth plurality of rows forming a fourth column, with the ones of the third set of pixels forming the third column adjacent to the fourth column formed from the ones of the fourth set of pixels, with the second boundary at the interface between the third column and the fourth column.

24. The apparatus as recited in claim 23, wherein:

the first plurality of rows includes a first row located on a first edge of the first column, the second plurality of rows includes a second row located on a second edge of the second column, the third plurality of rows includes a third row located on a third edge of the third column, the fourth plurality of rows includes a fourth row located on a fourth edge of the fourth column, with the first row, the second row, the second row, the third row, and the fourth row aligned within the image;

the first processing device includes a configuration to complete the error diffusion halftoning on the first row before the second processing device begins the error diffusion halftoning on the second row;

the second processing device includes a configuration to complete the error diffusion halftoning on the second row before the third processing device begins the error diffusion halftoning on the third row; and the third processing device includes a configuration to complete the error diffusion halftoning on the third row before the fourth processing device begins the error diffusion halftoning on the fourth row.

25. The apparatus as recited in claim 11, wherein:

the first set of pixels includes a third set of pixels and the second set of pixels includes the third set of pixels, with the ones of the first set of pixels located adjacent to the third set of pixels and the ones of the second set of pixels located adjacent to the third set of pixels.

26. The apparatus as recited in claim 25, wherein:

the first processing device includes a configuration to transfer a fifth set of values, corresponding to a first subset of pixels of the third set of pixels included within the first set of pixels, to the second processing device using the bus;

the second processing device includes a configuration to transfer a sixth set of values, corresponding to a second subset of pixels of third set of pixels included within the second set of pixels, to the first processing device using the bus;

the first processing device includes a configuration to perform the error diffusion halftoning on the sixth set of values; and the second processing device includes a configuration to perform the error diffusion halftoning on the fifth set of values.

27. An imaging device, comprising:

an interface arranged to receive data, corresponding to an image, from a computer;

a processor configured to generate color values, corresponding to pixels forming the image, using the data received from the interface;

a processing system arranged to receive the color values and including a first processing device to receive, over a first bus, a first set of values, included in the color values, corresponding to a first set of pixels and to perform halftoning on the first set of values to form a first set of halftone values, a second processing device to perform halftoning on a second set of values, included in the color values, corresponding to a second set of pixels to form a second set of halftone values, with ones of the first set of pixels located adjacent to the second set of pixels and with ones of the second set of pixels located adjacent to the first set of pixels and a second bus coupling the first processing device and the second processing device for transferring a third set of values from the halftoning of the ones of the first set of pixels to the second processing device and for transferring a fourth set of values from the halftoning of the ones of the second set of pixels to the first processing device, with the second bus having a lower maximum transfer rate than the first bus;

an image forming mechanism configured to form the image using the first set of halftone values and the second set of halftone values; and memory to store the color values, the first set of halftone values, and the second set of halftone values.

28. The imaging device as recited in claim 27, wherein:

the halftoning includes error diffusion halftoning;

the third set of values includes error terms generated from the error diffusion halftoning of the ones of the first set of pixels;

the fourth set of values includes error terms generated from the error diffusion halftoning of the ones of the second set of pixels;

the first set of pixels and the second set of pixels each include equal numbers of the pixels, with the first set of pixels and the second set of pixels; and with the ones of the first set of pixels adjacent to the ones of the second set of pixels within the image; and a boundary at an interface between the ones of the first set of pixels and the ones of the second set of pixels forms a substantially straight line within the image.

29. An inkjet printer for forming an image on media using ink, comprising:

a first printhead positioned to eject the ink onto the media for a first portion of the image;

a first printhead driver configured to generate a first set of electrical signals, used by the first printhead for the ejection of the ink, from a first set of halftone values;

a first halftone processor configured to perform error diffusion halftoning on a first set of values corresponding to a first set of pixels included in the first portion of the image to form the first set of halftone values;

a first memory to store the first set of values and the first set of halftone values;

a first memory controller configured to transfer the first set of values and the first set of halftone values to and from the first memory and the first halftone processor;

a first processor coupled to the first memory controller and the first halftone processor;

a second printhead positioned to eject the ink onto the media for a second portion of the image;

a second printhead driver configured to generate a second set of electrical signals, used by the second printhead for the ejection of the ink, from a second set of halftone values;

a second halftone processor configured to perform error diffusion halftoning on a second set of values corresponding to a second set of pixels included in the second portion of the image to form the second set of halftone values;

a second memory to store the second set of values and the second set of halftone values;

a second memory controller configured to transfer the second set of values and the second set of halftone values to and from the second memory and the second halftone processor;

a second processor coupled to the second memory controller and the second halftone processor;

a third printhead positioned to eject the ink onto the media for a third portion of the image;

a third printhead driver configured to generate a third set of electrical signals, used by the third printhead for the ejection of the ink, from a third set of halftone values;

a third halftone processor configured to perform error diffusion halftoning on a third set of values corresponding to a third set of pixels included in the third portion of the image to form the third set of halftone values;

a third memory to store the third set of values and the third set of halftone values;

a third memory controller configured to transfer the third set of values and the third set of halftone values to and from the third memory and the third halftone processor;

a third processor coupled to the third memory controller and the third halftone processor;

a fourth printhead positioned to eject the ink onto the media for a fourth portion of the image;

a fourth printhead driver configured to generate a fourth set of electrical signals, used by the fourth printhead for the ejection of the ink, from a fourth set of halftone values;

a fourth halftone processor configured to perform error diffusion halftoning on a fourth set of values corresponding to a fourth set of pixels included in the fourth portion of the image to form the fourth set of halftone values;

a fourth memory to store the fourth set of values and the fourth set of halftone values;

a fourth memory controller configured to transfer the fourth set of values and the fourth set of halftone values to and from the fourth memory and the fourth halftone processor; and a fourth processor coupled to the fourth memory controller and the fourth halftone processor;

a bus arranged to transfer error terms from performing the error diffusion halftoning between the first processor and the second processor, between the second processor and the third processor, and the third processor and the fourth processor.

30. The inkjet printer as melted in claim 29, wherein:

the first set of pixels and the second set of pixels include common ones of the pixels;

the second set pixels and the third set of the pixels include common ones of the pixels; and the third set of pixels and the fourth set of the pixels include common ones of the pixels.

31. A halftoning apparatus, comprising:

first means for halftoning on a first set of values received over a first bus and corresponding to a first set of pixels partitioned from a group of pixels forming an image;

second means for halftoning on a second set of values corresponding to a second set of pixels partitioned from the group of pixels forming the image with ones of the first set of pixels located adjacent to the second set of pixels and with ones of the second set of pixels located adjacent to the first set of pixels; and a second bus arranged to transfer a third set of values, from the halftoning of ones of the first set of values corresponding to the ones of the first set of pixels, to the second means for halftoning and for transferring a fourth set of values, from the halftoning of ones of second set of values corresponding to the ones of the second set of pixels, to the first means for halftoning, with the second bus having a lower maximum transfer rate than the first bus.

* * * * *

UNITED STATES PATENT AND TRADEMARK OFFICE
CERTIFICATE OF CORRECTION

| | |
|---|---|
| PATENT NO. | : 7,355,747 B2 |
| APPLICATION NO. | : 10/054652 |
| DATED | : April 8, 2008 |
| INVENTOR(S) | : Thomas B. Pritchard |

It is certified that error appears in the above-identified patent and that said Letters Patent is hereby corrected as shown below:

In column 14, line 47, in Claim 12, delete "tho" and insert -- the --, therefor.

In column 16, line 33, in Claim 24, delete "the second row," before "the third".

In column 18, line 63, in Claim 30, delete "melted" and insert -- recited --, therefor.

Signed and Sealed this

Nineteenth Day of August, 2008

JON W. DUDAS
*Director of the United States Patent and Trademark Office*